Jan. 13, 1970  C. R. ZIMMERMANN  3,488,933
CABLE TAPING DEVICE
Filed Jan. 5, 1967  2 Sheets-Sheet 1
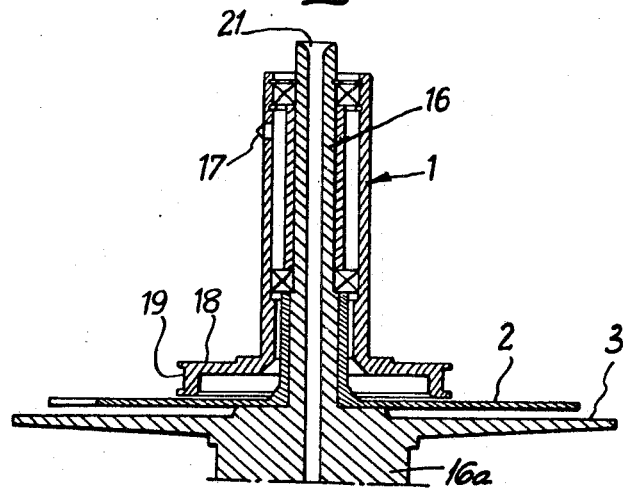
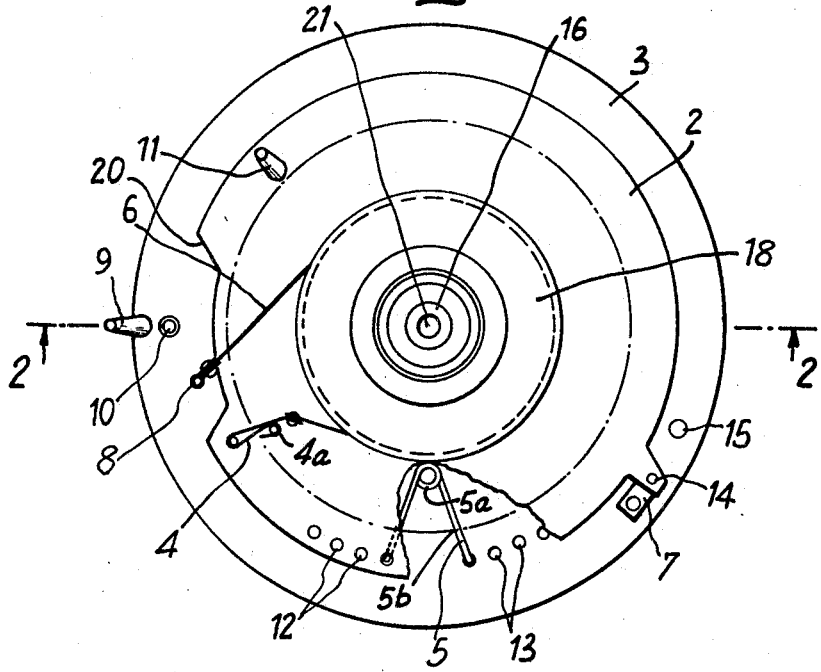
INVENTOR
CLAUDE R. ZIMMERMANN
BY
ATTORNEYS

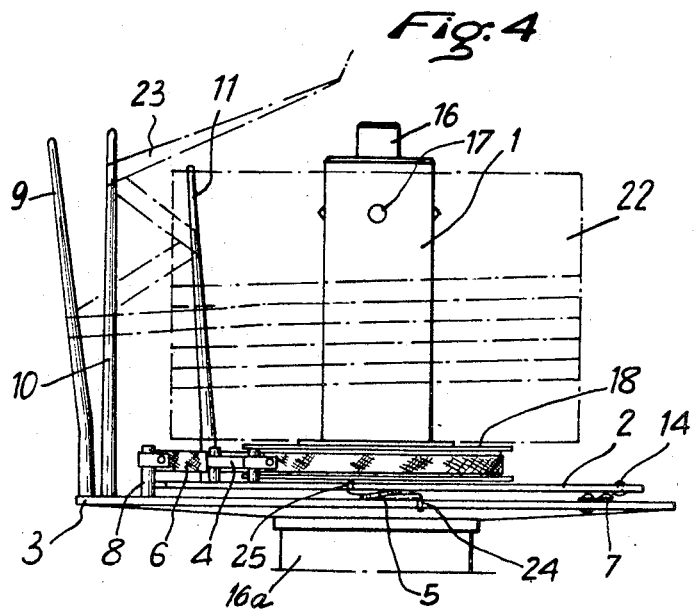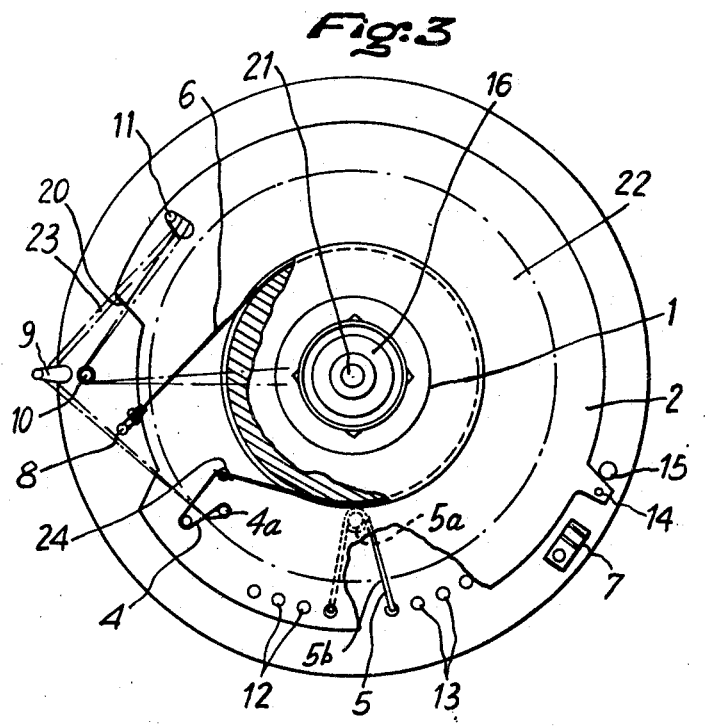

United States Patent Office 3,488,933
Patented Jan. 13, 1970

3,488,933
CABLE TAPING DEVICE
Claude R. Zimmermann, Chatou, France, assignor to Cablerie de Clichy (S.A.C.M.), Clichy, France, a company
Filed Jan. 5, 1967, Ser. No. 607,440
Claims priority, application France, Aug. 5, 1966, 72,214
Int. Cl. D02g 3/36
U.S. Cl. 57—18        2 Claims

ABSTRACT OF THE DISCLOSURE

A device particularly for applying a tape around an electrical conductor includes a taping head having an elongated tubular portion with a bore therethrough for the feeding of cable therethrough. A mandrel is rotatably mounted on the taping head adjacent the exit of the bore and it includes a flat table portion at a spaced location from the exit end of the taping head for supporting a bobbin of the tape. The taping head itself includes a flat table portion spaced slightly from the table portion of the mandrel and a second plate is rotatably mounted on the head between the table portion of the mandrel and the table portion of the taping head. A brake for the mandrel includes a band which is secured at one end to the table which is part of the taping head. The brake band is frictionally engaged around the mandrel flat table portion and has an opposite end secured to the intermediate plate between the mandrel and the table of the taping head. A spring is arranged to interconnect the plate and the table and it biases the intermediate plate and the table against relative movement. The ends of the brake are movable together upon relative movement of the intermediate plate and the table in one direction, in order to tighten the band around the mandrel and to slow the rotation of the mandrel. The ends of the band are movable in an opposite direction upon relative movement of the plate and the table in an opposite direction to loosen the band around the mandrel and to permit faster rotation thereof. The complete apparatus includes guide means for the tape which comprises a guide member on the plate and a guide member on the table. The tape is directed around a portion of each of these guide members and when the guide members are displaceable toward each other upon relative movement of the plate and the table, the tension on the tape is released.

SUMMARY OF THE INVENTION

This invention relates in general to wrapping or winding devices and in particular to a new and useful device for applying a tape or ribbon around an electrical conductor cable or the like including means for permitting the pay-out of the covering tape from a spool which insures the uniform tensioning of the tape as it is being payed out and the braking of the spool as necessary to provide even tape feed.

The present invention is particularly applicable for applying ribbons around electrical conductor cable which may either comprise a single or a multiple core. With machines customarily used for this type of process, particularly those for making telecommunication wires which are insulated with paper either with or without string, the quality and speed of production is limited primarily by the existing facilities for applying the tape or ribbon. With telephone wires which are insulated with paper the application of the paper is generally carried out by using a coaxial taping head on which is placed a roll or reel of paper which carries a tape or wound ribbon on a hollow center. The wire is passed through an axial passage defined on the taping head which corresponds to the center of the reel. The tape is applied around the wire by a drawing device using plates equipped with return rollers or fingers which rotate at maximum speeds at the order of 1500 r.p.m.

In accordance with the invention there is provided a device for applying ribbons or tapes around an electrical conductor cable or the like which includes a taping head which includes a hollow center through which the cable is advanced and which carries a reel in a manner permitting it to be rotated around the cable fed through the center. In accordance with a feature of the invention, the tape is fed around guiding fingers which are contained on two relatively movable plates which are keyed to each other by a spring permitting slight relative movement. The tensioning on the tape as it is fed off the reel and around the wire which is advanced through the center of the taping head will be maintained at a desirable rate even during the rapid feeding of the tape at high speeds. The construction is such that a very high speed of the pay-out of the tape may be accomplished without the tensioning on the tape exceeding its tear limit.

In the preferred form, the device includes a fixed taping head having a hollow center through which a cable or similar article to be wound is advanced and rotated. A mandrel is rotatably mounted over the taping head and it includes an end or bottom wall which supports a reel of tape material which is guided off the mandrel and onto the cable which is directed out through the opening in the taping head. In the preferred arrangement, a plate is rotatably mounted directly below the wall supporting the reel of tape over a flanged or table portion of the taping head. The tape is guided off the reel and around an upright finger or guide which is mounted on the fixed table and then is guided over a finger which is carried on the rotatable plate, disposed beneath the wall supporting the reel of tape material. The tape is once again guided around a finger and then it is directed to engage the cable which is exiting upwardly through the center of the taping head. A brake is provided for braking a drum area below the end face of the rotating mandrel which includes a band which extends around the drum area and is connected at one end to the rotatable plate and at its opposite end is affixed on the table. The movement of the rotatable plate below the mandrel can proceed up to a certain limit which is hindered by the action of an interconnecting spring between the plate and the table. The brake makes certain that some tension is applied to the tape as it is fed off and the movement between the movable plate and the table provides a means for changing the braking action on the brake in dependence upon the tension of the ribbon as it is directed over the guide fingers. The mechanism also further advantageously includes a stop switch which is actuated upon relative movement of the plate and the table beyond a predetermined amount.

Accordingly, it is an object of the present invention to provide an improved device for feeding a taping or ribbon material over an article such as a cable including means for guiding the tape as it is fed off a reel which insures that the tape will be subjected to a uniform tension during the operation.

A further object of the invention is to provide an improved mechanism for supporting a reel of tape in a position in which the tape may be fed off the reel over a central article such as a cable and which includes a guiding system for the tape and a braking system for the reel arranged to effect an even tensioning on the tape during its course of travel and permitting the tape to be fed at a high rate of speed without being severed.

A further object of the invention is to provide a cable taping device or ribbon applying apparatus which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a top plan view partly broken away of a taping device constructed in accordance with the invention;

FIG. 2 is a section taken along the line 2—2 of FIG. 1 but without showing the braking device and guiding fingers;

FIG. 3 is a partial top plan view and partial sectional view showing the parts in an advanced position from that indicated in FIG. 1; and FIG. 4 is a side elevational view of the device.

Referring to the drawings in particular, the invention embodied therein comprises a taping head having an elongated tubular portion 16 with a central bore 21 through which the electrical cable or conductor is passed. The taping head is provided with a hub portion 16 which includes a plate or table 3. A second plate or rotatable member 2 is rotatably mounted on the hub 16a. A mandrel generally designated 1 is rotatably mounted on the tubular portion 16 of the taping head and it includes a supporting end surface or flat plate portion 18 which is provided for receiving and supporting the bottom of a reel or bobbin 22 having a ribbon or tape 23 wound thereupon (FIG. 4). The bobbin 22 is held on the mandrel 1 by means of nipple 17 which extend into the bobbin core and prevent it from rotating relatively from the mandrel.

In accordance with the invention the mandrel 1 is provided with a lower drum portion 19 around which is directed a brake band or ribbon 6. The ribbon 6 is fixed to the table 3 by a nipple 8 at its one end and is directed around the drum 19 and is secured at its opposite end to the plate 2 by means of a pin spring 4 which is mounted at plate 2 on a pin 4a.

The plate 2 may be rotated relative to the table 3 within the limit permitted by a pin spring or V-shaped spring 5 which interconnects the two plates. The spring 5 includes one end which is adapted to fit into a selected one of a plurality of circumferentially spaced holes 13 on the table 3 and an opposite end which may be fitted into a selected one of circumferentially spaced holes 12 on the plate 2. In the normal or untensioned position of the spring 5, it will hold the plate 2 relative to plate or table 3 as indicated in FIG. 1. The spring 5 includes a central coiled portion 5a so that when the two plates 2 and 3 are moved relativley, the leg portions 5b thereof will be tensioned.

The plate 2 is provided with a radially outwardly extending projection 14 which is confined for movement between a fixed stop 15 on the plate 3 and an electrical contact or switch member 7 on the plate 3. When the projection 14 contacts the electrical contact 7, as indicated in FIG. 1, then the rotation of the taping head will be stopped. This will happen when the relative displacement of the plates 2 and 3 exceeds a certain limit.

In accordance with a feature of the invention, the tape 23 is guided off its associated reel 22 to pass first around a fixed guide finger 9 which is secured to the plate 3 and then around a guide finger 11 which is secured to the plate 2. As best indicated in FIG. 3, the tape is directed from the guide finger 11 around the guide finger 10 toward the center of the taping head adjacent the discharge end of the bore 21 defined therein. The positioning of the return fingers or guide fingers 9 and 10 with respect to the finger 11 is such that the result of the forces acting on the finger 11 which is connected to plate 2 will be constantly normal to the radius passing through the finger 11. In addition, the orientation of the return fingers 9, 10 and 11 is such that the tape 23 sets up a tensioning force which acts substantially perpendicular to the fingers 9, 10 and 11, and as a result the forces will be substantially parallel to and substantially neutral to the fibers of the tape.

The plate 2 is provided with an arcuate recess 20 which permits the relative displacement of the plate 2 with respect to the table 3 without any interference of the nipple 8 holding the brake ribbon 6. When the taping head rotates, the ribbon 23 is applied to the cable which is directed through the bore 21. As a result, a certain pay-off of the tape from the bobbin 22 is effected. The spring 5 will tend to expand from the position indicated in FIG. 3 to the position indicated in FIG. 1, and the fixed point 8 on the plate 3 and the point 24 at the opposite end of the brake band 6 tend to be brought together and as they do, there is a deformation of the spring 4. This produces a constantly acting braking force on the drum 19 and hence the mandrel 1. The maximum braking force which may be applied may be determined by the position of the stop 15 with respect to the projection 14. The braking of the bobbin 22 which is carried on the mandrel 1 increases the traction on the ribbon 23 and consequently finger 11 will approach fingers 9 and 10 causing a gradual releasing of the braking force by the brake ribbon 6. As a result, in normal operation a certain equilibrium is established between the force of the spring 5 tending to clamp the brake ribbon 6 and the reaction between the ribbon 23 on the fingers 9, 10 and 11 which will tend to release the brake band 6. If the reaction of the ribbon 23 exceeds a certain limit, projection 14 will close the electrical contact 7 and the taping head will be stopped.

Because of the unusual arrangement for regulating the tension on the tape or ribbon 23, the speeds of rotation obtained with a bobbin of paper tape can be much higher than those commonly known and which utilize rollers, for example. The taping of a telephone conductor 9/10 of a millimeter in diameter on which there may or may not be a previously disposed string, can be accomplished with a paper ribbon of 9 mm. fed at linear speeds of from 30 to 40 mm. for a taping pitch of 18 mm., and a speed of rotation of the head of 1670 to 2220 r.p.m. The use of paper bobbins having a capacity several times higher than that of the rollers of the prior art also permits a considerable reduction in the frequency of stoppages which will occur.

While a specific embodiment of the invention has been shown and described in detail to illustrate the application of the inventive principles, it will be understood that the invention may be embodied otherwise without departing from such principles.

What is claimed is:

1. A tape applying device comprising a taping head having an elongated tubular portion with a bore for the feeding of a cable therethrough, a tape reel supporting mandrel rotatably mounted on said head adjacent one end of the bore of said tubular portion, said tape head having a table adjacent one end of said mandrel, a plate rotatably mounted on said head between said table portion and said mandrel, a brake for said mandrel including a band secured at its one end to said table and being frictionally engaged around said mandrel and having an opposite end secured to said plate, spring means interconnecting said plate and said table and biasing them against relative movement, the ends of said brake being movable together upon relative movement of said plate and said table in one direction to tighten said band around said mandrel to slow rotation of said mandrel, the ends of said band being movable in an opposite direction upon relative movement of said plate and said table in the opposite direction to loosen the band around said mandrel and to permit faster rotation thereof, and guide means for the tape including at least one guide member on said plate and at least one guide member on said table around a portion of each of which said tape is adapted to be directed, said guide member on said plate being displaceable toward said guide member on said table to release the tension on said tape when said brake is being released upon relative movement of the ends thereof away from each other, said spring means including a U-shaped spring having a pair of legs, said table having a plurality of openings therethrough at circumferentially spaced locations and said plate having a plurality of openings therethrough at circumferentially spaced locations, one of said leg portions of said U-shaped spring extending into a selected opening of said plate and one of said leg portions of said spring extending into a selected opening of said table.

2. A tape applying device comprising a taping head having an elongated tubular portion with a bore for the feeding of a cable therethrough, a tape-reel supporting-mandrel rotatably mounted on said head adjacent one end of the bore of said tubular portion, said tape head having a table adjacent one end of said mandrel, a plate rotatably mounted on said head between said table portion and rotatably mounted on said head between said table portion and said mandrel, a brake for said mandrel including a band secured at its one end to said table and being frictionally engaged around said mandrel and having an opposite end secured to said plate, spring means interconnecting said plate and said table and biasing them against relative movement, the ends of said brake being movable together upon relative movement of said plate and said table in one direction to tighten said band around said mandrel to slow rotation of said mandrel, the ends of said band being movable in an opposite direction upon relative movement of said plate and said table in the opposite direction to loosen the band around said mandrel and to permit faster rotation thereof, and guide means for the tape including at least one guide member on said plate and at least one guide member on said table around a portion of each of which said tape is adapted to be directed, said guide member on said plate being displaceable toward said guide member on said table to release the tension on said tape when said brake is being released upon relative movement of the ends thereof away from each other, said mandrel is provided with a drum portion, said brake band extending around said drum portion, said spring means including a U-shaped pin having substantially two leg portions, said plate and said table having a plurality of circumferentially spaced openings, a respective leg of said spring extending into a selected one of the openings of each of said plate and said table, said guide means including a first upstanding post on said table, a second upstanding post on said table, and a third upstanding post on said table spaced radially inwardly from said first post, said tape being adapted to be guided around said first post, around said second post, and around said third post to the center of said taping head, and spring means connecting said opposite end of said brake drum to said plate permitting resilient displacement of said band as said brake band is tightened around said drum.

References Cited

UNITED STATES PATENTS

| | | | |
|---|---|---|---|
| 1,937,918 | 12/1933 | Smith et al. | 57—15 |
| 2,134,994 | 11/1938 | Zarafu | 57—3 |
| 2,253,740 | 8/1941 | Van Hook | 57—18 |
| 2,462,303 | 2/1949 | Bouget | 57—16 |

FOREIGN PATENTS

| | | |
|---|---|---|
| 1,143,181 | 4/1957 | France. |
| 405,401 | 2/1934 | Great Britain. |

BILLY S. TAYLOR, Primary Examiner

U.S. Cl. X.R.
242—75.43, 156.2